United States Patent [19]

Berthoux et al.

[11] 3,708,523

[45] Jan. 2, 1973

[54] PROCESS OF MANUFACTURING ACRYLIC DERIVATIVES

[75] Inventors: Jean Berthoux, 69 Decines; Gerard Schneider, 69 Clauire; Renaud de Surville, 92 Boulogne-Billancourt, all of France

[73] Assignee: PROGIL, Paris, France

[22] Filed: July 2, 1971

[21] Appl. No.: 159,535

[30] Foreign Application Priority Data

July 8, 1970 France.................................7026295

[52] U.S. Cl. .........................260/486 D, 260/526 N
[51] Int. Cl. ........................C07c 69/54, C07c 57/04
[58] Field of Search.....................260/486 D, 526 N

[56] References Cited

UNITED STATES PATENTS 2,087,466 7/1937 Bauer .............................260/486 D Primary Examiner—Lorraine A. Weinberger
Assistant Examiner—Paul J. Killos
Attorney—Alvin Browdy and Sheridan Neimark

[57] ABSTRACT

A process for making acrylic derivatives from acrylic acid and lower esters thereof by dehydrochlorination of the corresponding α-chloropropionic acid or ester in the vapor phase with a catalyst in the presence of added gaseous hydrogen chloride.

8 Claims, No Drawings

PROCESS OF MANUFACTURING ACRYLIC DERIVATIVES

This invention relates to a process of manufacturing acrylic derivatives from acrylic acid and its esters by dehydrochlorinating the corresponding α-chloropropionic derivatives.

It is known that acrylic acid may be obtained by means of several different techniques. For example, a well-known process consists in directly oxidizing propylene with oxygen. According to another technique which is apparently less common and which may be utilized to obtain acrylic acid and its esters, chloropropionic derivatives are dehydrochlorinated in the presence of catalysts. This process does not offer special difficulties when starting with β-chloropropionic compounds; however, on the contrary, it is difficult to achieve when the α-isomers are the starting materials because they are difficult to dehydrochlorinate. α-chloropropionic acid is a raw material which is more readily available than β-chloropropionic acid. However a process for dehydrochlorinating α-chloropropionic acid and esters has been described which comprises passing these compounds in the vapor phase onto catalysts which are phosphates, sulfates or halides of the group II metals, these catalysts being in most cases activated; especially when calcium sulfate is used. However, this process does not yield quite satisfactory conversion rates and yields. Moreover the relatively high temperatures used — generally 400°C. — lead to product degradations which result in compound losses with tar and carbon formation which in turn foul the catalyst.

It is accordingly an object of the present invention to provide a process which avoids the hereinabove disadvantages and gives high conversion rates of the raw material and quite good yields of the corresponding acrylic derivatives.

These and other objects are obtained by the present process which comprises contacting α-chloropropionic acid or esters thereof in the vapor phase with a dehydrochlorination catalyst of the known type in the presence of added gaseous hydrogen chloride.

It is surprising that good results are obtained according to this invention since hydrogen chloride is per se a product forming during the reaction.

As starting materials there may be used α-chloropropionic acid or a $C_1$ to $C_5$ alkyl ester thereof, such as methyl, ethyl, propyl, isopropyl, etc. It may be a pure or a technical product. In the case of α-chloropropionic acid, for example, the raw product obtained by chlorinating propionic acid, according to known processes, for example in the presence of phosphorus trichloride as catalyst, and containing, besides α-chloropropionic acid, low proportions of unreacted propionic acid, dichloropropionic acid, chloroacetic acid, and optionally traces of phosphorus derivatives may be used as well as pure α-chloropropionic acid recovered by distilling the reaction mixture of propionic acid chlorination.

The quantity of gaseous hydrogen chloride to be used according to the invention is not an especially critical feature and may vary within large limits. Generally in order to obtain a good conversion rate and no degradation of the raw material it is advisable to use at least about 0.2 mole hydrogen chloride for each mole of α-chloropropionic acid or ester. Larger quantities may be employed, for example, up to 2 moles of hydrogen chloride for each mole of starting material to be dehydrochlorinated. A molar ratio HCl/α-chloropropionic derivative which is higher than 2/1 is not deleterious for the reaction; however preferably such a large quantity of hydrogen chloride is not introduced because it results in a commercially less satisfactory process; indeed this leads to a greater consumption of calories during the process and eventually to the other drawbacks from a practical point of view.

The catalyst may be chosen from among the dehydrochlorination catalysts of known type, especially alkali-earth metal, zinc or magnesium phosphates and sulfates. Among them, calcium sulfate is preferred. These catalysts are employed in a substantially anhydrous state, unactivated, in the form of granules, the dimensions of which vary, for example, from 0.5 to 5 mm.

The reaction temperature must be at least sufficient so that the α-chloropropionic raw material is substantially maintained in the vapor phase. Practically, the lower temperature limit is about 200°C. and a desirable range is between 200° and 350°C., preferably 280°-320 °C. It is advisable not to carry out the reaction above 350°C., because, in this case, side-reactions take place, such as acid decarboxylation, carbonization, polymerization and tar formation, which result in a decrease in yield and catalyst fouling. Generally, it is carried out at atmospheric pressure although a lower or higher pressure may be applied.

The reaction develops quickly. A residence time equal to or less than 30 seconds is in most cases sufficient to give good conversion rates.

In a practical way of achieving the process according to this invention, the starting α-chloropropionic material is first vaporized, then admixed with hydrogen chloride, the mixture is further preheated, for example up to the reaction temperature and then is passed through a tubular reactor containing the catalyst. It is also possible to preheat the α-chloropropionic derivative and hydrogen chloride separately before mixing them. The dehydrochlorinating reaction may also be conducted, using the techniques of a fluidized catalyst. Preferably the reactor is provided with an external heating device, for example a mantel in which a heat-transfer liquid circulates, in order to maintain the reactor at the required temperature. When leaving the reactor, the gaseous effluent is cooled to about 15°-25°C. so that a vapor phase is obtained containing essentially hydrogen chloride, which was initially introduced and formed during the reaction, and a liquid phase comprising the desired compound. The gaseous HCl may be recycled to the reaction in a desirable amount. The liquid phase contains some β-chloropropionic isomer of the α-chloropropionic derivative used as starting material, which has formed during the reaction by combination of the acrylic acid and HCl and, above all, during the separation of the reaction constituents; however, this is not a disadvantage in the process because such β-chloropropionic compound can be quantitatively dehydrochlorinated to the acrylic compound by recycling. For that, the hereinabove mentioned liquid phase is for example, distilled to separate the acrylic derivative obtained and the distillation residue which contains β-chloropropionic acid or ester and possibly a small proportion of unreacted α-chloropropionic isomer, is recycled to the dehydrochlorination reaction. It is also possible to distill all the liquid phase before recycling the chloropropionic fraction.

The following examples illustrate the process according to the invention. The parts and percentages are given by weight.

EXAMPLE 1

In a tubular reactor filled with 360 parts of anhydrous calcium sulfate granules and maintained at 300°C., there was introduced per hour a mixture of 12 parts gaseous HCl and 125 parts α-chloropropionic acid containing 0.2 percent propionic acid, 0.2 percent α,α-dichloropropionic acid and 0.1 percent monochloroacetic acid. The molar ratio HCl/organic feed was thus 0.29. The α-chloropropionic acid had been vaporized, admixed with HCl and the mixture heated to the reaction temperature before entering the reactor. The residence time in the apparatus was 17 seconds. When leaving the reaction zone, the gaseous effluent was cooled and there were recovered, per hour, 43.1 parts gaseous HCl and 91 parts of a liquid phase giving, by distillation, 63.4 percent acrylic acid, 33 percent β-chloropropionic acid, 1.7 percent α-chloropropionic acid, the residue being polymers.

The α-chloropropionic acid conversion rate was 98.8 percent. Since β-chloropropionic acid may be quantitatively converted into acrylic acid, as explained above, this was taken into account in the calculation of the yield of desired product which is thus 95.2 percent with regard to the reacted raw material.

After 20 hours running under the hereinabove conditions, there was observed no fouling nor loss in efficiency of the catalyst.

EXAMPLE 2

The procedure of example 1 was followed with the same starting material, but using, for each hour, 45.6 parts gaseous hydrogen chloride for 136 parts of acid. The molar ratio HCl/organic feed was 1/1. The residence time in the reaction zone was 11 seconds.

There was recovered 81.3 parts HCl/hour and 101 parts/hour of a liquid phase containing 58.6 percent acrylic acid, 31.0 percent β-chloropropionic acid, and 1.5 percent α-chloropropionic acid.

The conversion rate of α-chloropropionic acid was 98.9 percent and the yield of acrylic and β-chloropropionic acids was 90.0 percent with regard to the reacted raw material.

EXAMPLE 3

The procedure of the foregoing examples was followed but introducing into the reactor 47.5 parts HCl/hour and 140 parts/hour of an organic feed comprising 35 percent β-chloropropionic acid and 63 percent β-chloropropionic acid, this later coming from a former dehydrochlorinating operation according to the invention (the reminder to 100 percent was high-boiling compounds). The residence time was 12 seconds at a temperature of 300°C.

There was recovered from the gaseous effluent leaving the reactor, for each hour, 81.6 parts of HCl and 105 parts of a liquid organic phase containing 5.3 percent α-chloropropionic acid, 28.8 percent of β-chloropropionic acid and 57.4 percent of acrylic acid. The β-chloropropionic acid which formed during the reaction was used in a further operation.

EXAMPLE 4

There was introduced into a reactor containing calcium sulfate and maintained at 300°C., a mixture, preheated in accordance with Example 1, of 65.7 parts HCl/hour and 134 parts/hour of a raw α-chloropropionic acid containing 4.3 percent αα-dichloropropionic acid, 1.1 percent propionic acid, 0.1 percent acetic acid, 0.4 percent monochloracetic acid and 0.4 percent phosphorus derivatives. The molar ratio HCl/α-chloropropionic acid was 1.55/1. The residence time in the reactor was 9 seconds.

There was recovered, after the reaction, 80.3 parts gaseous HCl/hour and 111 parts/hour of a liquid phase containing 22.8 percent acrylic acid, 12.2 percent β-chloropropionic acid and 62.0 percent α-chloropropionic acid.

The conversion rate of the starting α-chloropropionic acid was 45.3 percent and the yield of acrylic and β-chloropropionic acids was 91.1 percent.

It will be obvious to those skilled in the art that various changes may be made without departing from the scope of the invention and the invention is not to be considered limited to what is described in the specification.

What is claimed is:

1. In a process of manufacturing acrylic derivatives selected from the group consisting of acrylic acid and $C_1$ to $C_5$ alkyl esters thereof by dehydrochlorinating the corresponding α-chloropropionic acid or esters in the vapor phase with a catalyst, the improvement which comprises conducting the reaction in the presence of added gaseous hydrogen chloride.

2. A process according to claim 1 wherein the quantity of added hydrogen chloride is between 0.2 to 2 moles for each mole of α-chloropropionic acid or ester.

3. A process according to claim 1 wherein the catalyst is used in the anhydrous state and is selected from the group consisting of earth-alkali metal, zinc and magnesium phosphates and sulfates.

4. A process according to claim 3 wherein the catalyst is calcium sulfate.

5. A process according to claim 1 wherein the reaction temperature is between 200°C. and 350°C.

6. A process according to claim 5 wherein the reaction temperature is between 280°C. and 320°C.

7. A process according to claim 1 wherein the gaseous effluent from the reaction is cooled in order to separate gaseous hydrogen chloride and a liquid phase containing said acrylic acid or ester.

8. A process according to claim 1 wherein any β-chloropropionic acid or ester which has formed during the reaction is recycled to the dehydrochlorinating zone.

* * * * *